United States Patent Office 3,236,775
Patented Feb. 22, 1966

3,236,775
HYDROXYLATED HIGH MOLECULAR WEIGHT NAPHTHENIC HYDROCARBONS IN LUBRICANTS
William N. Axe, Sidney Schiff, and James T. Gragson, Bartlesville, Okla., assignors to Phillips Petroleum Company, a corporation of Delaware
No Drawing. Original application Aug. 4, 1961, Ser. No. 129,219. Divided and this application Sept. 28, 1964, Ser. No. 399,867
4 Claims. (Cl. 252—52)

This application is a division of our copending parent application, Serial No. 129,219, filed August 4, 1961.

This invention relates to novel compositions of matter comprising high molecular weight naphthene carbinols, which includes lubricating oil carbinol. In other aspect, it relates to the use of the same as novel lubricating oil additives for imparting oxidation inhibiting and solids dispersing properties to lubricating oils to which they are added. In another aspect, it relates to novel lubricating oil compounds containing said additives. In another aspect, it relates to novel processes of making said novel carbinols, novel processes of making said novel additives, and novel processes of making said novel lubricating oil compounds. In another aspect, it relates to novel processes of hydroxylating high molecular weight naphthenic hydrocarbons by reaction with formaldehyde and a normally nonexplosive peroxide selected from the group consisting of hydrocarbon peroxides and hydroperoxides, to novel compositions of matter comprising hydroxylated high molecular weight naphthenic hydrocarbons produced by said novel processes, to the use of said novel compositions produced by said novel processes as novel lubricating oil additives for imparting oxidation inhibiting and solids dispersing properties to lubricating oils to which they are added, and to novel lubricating oil compounds containing said novel compositions produced by said novel processes.

One object of this invention is to produce a useful composition of matter comprising a high molecular weight naphthene carbinol.

Another object is to produce a lubricating oil additive for imparting oxidation inhibiting and solids dispersing properties to lubricating oils.

Another object is to provide a lubricating oil compound which resists oxidation and which will tend to keep solid materials, such as carbon produced by internal combustion engine explosions, suspended in the oil.

Numerous other objects and advantages will be apparent to those skilled in the art upon reading the accompanying specification and claims.

The high molecular weight hydrocarbons which are the starting hydrocarbon materials for the process of this invention are available in quantity principally from lubricating oil fractions of petroleum. The essential characteristics of these hydrocarbons are that they have at least one naphthenic (cycloparaffinic) ring in their structure and have molecular weights (average) of 250 to 1500, preferably 350 to 1000. These hydrocarbons occur in petroleum in very complex mixtures which have never been completely separated into their component compounds and consequently the exact structures of all the molecules making up these mixtures have never been completely determined. Methods of characterizing these mixtures are available, however, for example, in K. van Nes and H. A. van Westen, "Aspects of the Constitution of Mineral Oils," Elsevier Publishing Company, New York (1951), whereby the distribution of the carbon among naphthenic rings, aromatic rings and aliphatic chains can be determined, pages 281–287. From these data and a molecular weight determination the average constitution of the hydrocarbon fraction can be established.

Lubricating oil obtained from petroleum from these characterizations is a mixture of molecules made up of naphthene rings, aromatic rings and aliphatic chains. These rings can be fused, joined together by carbon-to-carbon bonds without being fused, or they can be joined through aliphatic groups. Alkyl groups are present in the molecules. The method of Van Nes and Van Westen is based on a fused ring structure.

Although the hydrocarbons suitable for the process of this invention are available from petroleum refining, synthesized hydrocarbons and hydrocarbon mixtures can be used when they have the properties outlined above. For example, hydrocarbons of the disclosed molecular weight containing aromatic rings but no naphthenic rings can be at least partially hydrogenated to produce hydrocarbons with naphthenic rings, thus converting these materials to hydrocarbons suitable for use in the present process of making lubricating oil additives.

While any naphthenic hydrocarbons having a molecular weight between 250 and 1500 are suitable as the feedstock for the practice of this invention, it is preferred to use a lubricating oil cut of naphthenic hydrocarbons between 350 and 1000 molecular weight, because it then has about the same vapor pressure and boiling point as the lubricating oil molecules and will stay with the lube oil during use. Preferred hydrocarbons average at least one naphthenic ring per molecule although the presence of a small amount of paraffinic diluents can be tolerated. The preferred hydrocarbons should be substantially free of asphaltenes and resins. With charge stocks in the lubricating oil range of SAE 10 and higher viscosities, the charge hydrocarbons are preferably first solvent refined to a viscosity index (V.I.) of at least 75, more preferably 85 to 120. These preferred hydrocarbons may contain up to 0.5 weight percent each of sulfur, nitrogen and oxygen as impurities therein without any noticeable effect on the processes or product of this invention.

No complete analysis need be made of the feedstock other than enough to know that it comes in the class set forth in the preceding paragraph. However, some more information will be given concerning the type feedstocks used in the following examples, namely typical 10, 20 and 50 lubricating oil stocks and a typical heavy lubricating oil known as "250 heavy." This information is given in Table I:

*Table I*
ANALYTICAL DATA AND STRUCTURAL GROUP ANALYSIS OF TYPICAL LUBRICATION OILS

| Type of Lubricating Oil Stock | Viscosity, SUS | | Viscosity Index VI | Sp. Gr., 60/60° F. | V.G.C., 210° F. | Density 70° C. | R.I., 70° C. | Mol. Wt. | $R_T$ | $R_A$ | $R_N$ | Percent | | | |
|---|---|---|---|---|---|---|---|---|---|---|---|---|---|---|---|
| | 100° F. | 210° F. | | | | | | | | | | $C_R$ | $C_A$ | $C_N$ | $C_P$ |
| 10 | 123 | 41 | 99 | .86 | .80 | .82 | 1.45 | 357 | 1.57 | 0.10 | 1.47 | 35.0 | 2.0 | 33.0 | 65.0 |
| 20 | 352 | 55 | 96 | .88 | .81 | .84 | 1.47 | 390 | 2.00 | 0.43 | 1.57 | 36.0 | 10.1 | 25.9 | 64.0 |
| 50 | 1,329 | 101 | 93 | .89 | .80 | .85 | 1.47 | 647 | 2.68 | 0.58 | 2.10 | 26.0 | 6.5 | 19.5 | 74.0 |
| 250 Heavy | 4,278 | 205 | 93 | .91 | .82 | .87 | 1.48 | 715 | 3.62 | 0.89 | 2.58 | 31.2 | 10.0 | 21.2 | 68.8 |

In the above Table I, the tests, nomenclature, and abbreviations are well known in the art. Sp. gr. is specific gravity, V.G.C. is viscosity gravity constant, R.I. is refractive index, and mol. wt. is molecular weight. The general procedure in making the above analysis follows that in said publication, "Aspects of the Constitution of Mineral Oils," cited above, pages 251–287, known as the direct method. While the values in the table were obtained from specific samples by the best analysis available, when applied to their type of lubricating oil, they still are only approximate values.

$R_T$ is mean total number of rings per molecule.

$R_A$ is mean number of aromatic rings per molecule.

$R_N$ is mean number of naphthene rings per molecule.

Percent $C_R$ is percentage of total carbon in ring structure, $C_A$ the same for aromatic ring structure, $C_N$ the same for naphthenic ring structure, and $C_P$ the same for paraffinic structure.

The formaldehyde for the process may be supplied as formaldehyde gas or in any commercial form of material that will release formaldehyde readily. In Examples I and III, formalin was used, which was an aqueous solution of 37% by weight $CH_2O$, but which preferably ranges from 30 to 42% $CH_2O$ by weight, with 6 to 15% by weight methanol to inhibit precipitation of formaldehyde polymer in transit. However, the concentration of the formaldehyde aqueous solution is not critical as long as sufficient formaldehyde is available for the chemical reaction of this invention. Obviously, if freshly generated formaldehyde is used, there need be no methanol present. The usual impurities of commercial formalin may be present without affecting the invention. In Example II, paraformaldehyde was used, containing about 95% formaldehyde. Paraformaldehyde is defined as a mixture of polyoxymethylene glycols preferably containing from 93 to 99% by weight of formaldehyde, which releases formaldehyde readily at the temperature of 275° F. of the example. Other known sources that readily release formaldehyde may be used in the practice of this invention if otherwise compatible with the reaction of this invention, as can be determined by routine tests, and the term formaldehyde as used in this application is intended to cover formaldehyde supplied by any means known to the prior art. However, note that Example IV teaches that acetaldehyde is not equivalent to formaldehyde in the present invention.

The hydrocarbon peroxides and hydroperoxides preferred for use in this process are those which decompose at usable rates under the reaction conditions. Those which decompose relatively slowly can be added to the reaction mixture in rather large quantities without unduly rapid decomposition and are more suitable for batch reactions. Those which decompose too rapidly for use in batch operations can be used in continuous operations or in semi-continuous operations in which the peroxide is added slowly to the reaction mixture, thus effecting relatively slow decompositions. The preferred range of hydrocarbon peroxides and hydroperoxides for use in the present invention are those having a half-life of 15 minutes to 50 hours in a benzene solution of 0.2 gram mole of peroxide group (—O—O—) per liter of benzene at the temperature of the reaction of this invention. One skilled in the art can easily determine which peroxides are within this preferred range, as explained in the article "Correlation of Peroxide Half-Life With Polymerization" by O. L. Mageli, S. D. Stengel and D. F. Doehnert in Modern Plastics, March 1959, pages 135–137, 140, 144 and 172; or "Evaluation of Organic Peroxides on the Basis of Half-Life Data" by D. H. Doehnert and O. L. Mageli in Modern Plastics, February 1959, pages 142, 144 and 146–148. Di-t-butyl peroxide is most preferred, having a half-life at 266° F. of 6.4 hours, next preferred peroxides being dicumyl peroxide and cumene hydroperoxide with half-lives at that temperature of 1.84 and 113 hours, respectively. At 475° F. the latter has a half-life of 29 hours.

Suitable peroxides coming inside these half-life ranges, in decreasing order of activity, are hydroxyheptyl peroxide, cyclohexanone peroxide, t-butyl peracetate, di-t-butyl diperphthalate, t-butyl perbenzoate, methyl ethyl ketone peroxide, dicumyl peroxide, t-butyl hydroperoxide, di-t-butyl peroxide, p-methane hydroperoxide, pinane hydroperoxide, 2,5-dimethylhexane-2,5-dihydroperoxide, and cumene hydroperoxide.

The reaction is carried out by contacting the hydrocarbon, formaldehyde and peroxide at elevated temperature with agitation. Many types of apparatus are suitable for carrying out the reaction including rocking autoclaves, mechanically stirred tanks, etc. The reaction can be carried out batchwise, semi-continuously or continuously. As the molecular weight of the carbinol group —$CH_2OH$ is 31 and a hydrogen is lost from the oil, giving a net addition of 30, the molecular weight of the lubricating oil carbinols produced from said oils having molecular weights from 250 to 1500 are therefore 280 to 1530.

Reaction conditions suitable for the process are:

*Table II*

REACTION CONDITION RANGES

| Condition | Ranges | |
|---|---|---|
| | Broad | Preferred |
| Temperature, ° F | 225–400 | 160–325 |
| Pressure, p.s.i.g | 100–1,000 | 200–600 |
| Reaction time, hours | ¼–25 | ½–10 |

While the reaction can be carried out with widely varying amounts of reactants, the following ratios of reactants are preferred:

*Table III*

REACTANT RATIOS

| Components | Ranges | |
|---|---|---|
| | Broad | Preferred |
| Peroxide/oil (mol) | 0.02 to 5 | 0.5 to 1.5 |
| Formaldehyde/oil (mol) | 0.5 to 50 | 1 to 15 |

Ordinarily, the peroxide/oil ratio is at least 0.2, the lower ratios being used when it is advantageous to blend lesser quantities of oil in making a lubricating oil.

The reaction mixture is readily purified for use by washing with water aqueous sodium carbonate or bicarbonate, or other basic wash, followed by filtering and drying.

The purified product is blended with lubricating oil in an amount to produce a hydroxyl number of at least 0.2. Amounts producing hydroxyl numbers from 0.5 to 50 or higher are quite satisfactory. The volume ratio of additive and oil will depend on the hydroxyl number of the additive concentrate and the hydroxyl number of the final blend. Using additives made from high molecular weight oils, such as about 700, representative oil blends have hydroxyl numbers of 1 to 15. Using additives made from lower molecular weight oils, considerably higher hydroxyl numbers results from the same volume percent of additive hydroxylated to the same mole percent.

Hydroxyl number is determined as described in Analytical Chemistry, volume 31, page 1602 (1959).

EXAMPLE 1

A mixture of 94.1 grams of 250 heavy lubricating oil stock, 133.7 grams of formalin and 18.4 grams of di-t-butyl peroxide was heated to 275° F. and shaken for 8 hours at this temperature. The product in benzene-pentane solution was washed with water, dried and stripped of solvent.

In these examples the product was dried by washing with saturated aqueous sodium chloride and filtering through anhydrous magnesium sulfate. However, in commercial operations other well known and cheaper methods of drying can be employed, such as adding benzene and distilling off benzene and water.

A 0.5 weight percent solution of the hydroxylated product in toluene gave an interfacial tension with water of 17.6 dynes/cm.$^2$ compared to 34.5 dynes/cm.$^2$ for said 250 stock in toluene.

The dispensancy of the hydroxylated product was compared by the following experiment to a calcium petroleum sulfonate prepared according to the preferred embodiment of the U.S. patent application of Whitney et al., Serial No. 665,985, filed June 17, 1957, now abandoned:

To 100 ml. of a 5 weight percent solution (in kerosene) of calcium petroleum sulfonate and the same percent solution of said hydroxylated product was added 1.0 gram of Philblack A carbon black and mixed well. At the end of 19 hours all of the carbon black in the sulfonate solution had settled while after 43 hours some carbon black was still suspended in the hydroxylated product.

A blend of 10 and 50 stock with 5 weight percent hydroxylated product was submitted to a McKee strip tester to measure detergency and oxidation stability. The deposit weights for duplicate tests were 36.4 and 56.9 mg. For comparison a similar viscosity blend containing 250 stock (without inhibitor) gave deposit weights of 198 and 206 mg.

*Example II*

A mixture of 51.4 grams of 50 lubricating oil stock, 12.0 grams of di-t-butyl peroxide, and 11.5 grams of paraformaldehyde was shaken at 275° F. for 6 hours in a rocker bomb. The maximum pressure attained was 250 p.s.i.g. The aqueous solution, filtered and dried, and the benzene was stripped. The product, which was a deep red viscous oil, had a molecular weight of 856 and a hydroxyl number of 131 mg. KOH/g. oil.

The product showed I.R. peaks at 2.9 (hydroxyl), 5.8, 8.6 and 9.6 microns in a standard infrared spectometer test.

*Example III*

A mixture of 43.9 grams of 10 lubricating oil stock, 49.0 grams of formalin, and 15.7 grams of di-t-butyl peroxide was shaken for 5 hours at 275° F. in a rocker bomb. The maximum pressure that developed was 380 p.s.i.g. The product was dissolved in benzene, washed with water and sodium bicrabonate, filtered and dried. The product, after stripping the benzene, had a molecular weight of 525 and a hydroxyl number of 174 mg. KOH/g. oil.

This product showed I.R. peaks at the same wave lengths as Example II.

*Example IV*

A mixture of 48.0 grams of 10 lubricating oil stock, 31.4 grams of acetaldehyde and 15.6 grams of di-t-butyl peroxide was heated in a rocker bomb. A sudden reaction occurred after heating about three-fourths hour, as indicated by a sudden pressure rise to approximately 2000 p.s.i.g. The cooled product was washed with NaHCO$_3$, H$_2$O and filtered and dried.

The I.R. spectrum showed no alcohol band at 2.9 microns.

The tests made in Example II above are sufficient to identify the new composition of matter produced. Solution of the product in benzene, washing it with water and sodium bicarbonate aqueous solution, filtering and drying the product and stripping the benzene from it eliminates all the by-products and unreacted starting materials from the high molecular weight naphthene carbinol product. The increase in molecular weight, the hydroxyl number, and the I.R. peak at 2.9, coupled with the amount of formaldehyde consumed, indicate that the following reactions may have occurred:

(1) The di-t-butyl peroxide breaks down into two free indicator radicals:

$$(CH_3)_3COOC(CH_3)_3 \rightarrow 2(CH_3)_3CO-$$

(2) One of the free initiator radicals abstracts a hydrogen atom from a naphthene ring of a lubricating oil molecule making it into a lubricating oil free radical:

$$(CH_3)_3CO- + R-Z\bigcirc CH_2 \longrightarrow (CH_3)_3COH + R-Z\bigcirc CH-$$

In the above formulas "Z" is a naphthene ring residue and "R" is a lubricating oil molecule residue, so that $$R-Z\bigcirc CH_2$$

represents a lubricating oil molecule.

(3) The lubricating oil free radical combines with a molecule of formaldehyde to form a lubricating oil —CH$_2$O— free radical:

$$R-Z\bigcirc CH- + CH_2O \longrightarrow R-Z\bigcirc CHCH_2O$$

(4) The lubricating oil —CH$_2$O— free radical abstracts a hydrogen atom from another lubricating oil molecule producing a high molecular weight lubricating oil carbinol product and a lubricating oil free radical:

$$R-Z\bigcirc CHCH_2O- + R-Z\bigcirc CH_2 \longrightarrow$$

$$R-Z\bigcirc CHCH_2OH + R-Z\bigcirc CH-$$

(5) The chain of events continues until broken by chain-terminating side reactions.

(6) It is indicated by said tests that this product of Example II is lubricating oil carbinol of a molecular weight of 856 and it is also evident that the product is the reaction product of the process described in said example.

The operability of the present invention is not dependent on the accuracy of the chemical theory set forth in the preceding six paragraphs numbered (1) to (6). We believe the carbinolation will probably occur on the ring as stated in paragraphs (2) and (3), but it could also occur on the alkyl chain of the lubricating oil molecule residue "R." The chemical names "naphthalene carbinol" and "carbinolated naphthene fraction" include carbinolation on either the alkyl chain or on the naphthene ring.

The increased ability of the product of this invention to disperse and suspend carbon, carbon black, sludge and other foreign materials is due to the introduction of the hydroxyl group. The mechanism of adding this hydroxyl group, as set forth in the above equations (1) to (6), is by carbinolation of the lubricating oil molecule. In a strict chemical sense the oil molecule has been carbinolated, but from the standpoint of functionality the product has been hydroxylated (since the added methylene group obviously has no functional effect on a hydrocarbon of 250 to 1500 molecular weight).

While certain examples have been given for purposes of illustration, the invention is obviously not limited thereto, but is as broad as it is described in the specification and as claimed.

Having described our invention, we claim:

1. A lubricant comprising a major amount of mineral lubricating oil and a minor amount of an oxidation inhibiting and solids dispersing additive sufficient to produce a hydroxyl number of from 0.5 to 50 therein comprising a high molecular weight carbinolated naphthene fraction having a molecular weight between 280 and 1530.

2. A lubricant comprising a major amount of mineral lubricating oil and a minor amount of an oxidation inhibiting and solids dispersing additive sufficient to produce a hydroxyl number of from 0.5 to 50 therein comprising a high molecular weight carbinolated naphthene fraction having a molecular weight between 280 and 1530 containing at least one naphthene ring, said naphthene ring having attached to at least one of its carbon atoms a carbinol group —CH$_2$OH.

3. A lubricant comprising a major amount of mineral lubricating oil and a minor amount of an oxidation inhibiting and solids dispersing additive sufficient to produce a hydroxyl number of from 0.5 to 50 therein comprising a high molecular weight carbinolated naphthene fraction having a molecular weight between 380 and 1030 containing at least one naphthene ring, said naphthene ring having attached to at least one of its carbon atoms a carbinol group —CH$_2$OH, said naphthene fraction being made from a mineral lubricating oil with a viscosity index of at least 75, substantially free of asphaltenes and resins, having an average of more than one naphthenic ring per molecule, and having an average molecular weight of 350 to 1000.

4. A lubricant comprising a major amount of mineral lubricating oil and a minor amount of an oxidation inhibiting and solids dispersing additive sufficient to produce a hydroxyl number of from 0.5 to 50 therein comprising a high molecular weight carbinolated naphthene fraction having a molecular weight between 380 and 1030 containing at least one naphthene ring, said naphthene fraction being made from a mineral lubricating oil with a viscosity index of at least 75, substantially free of asphaltenes and resins, and having an average molecular weight of 350 to 1000.

References Cited by the Examiner
UNITED STATES PATENTS

| | | | |
|---|---|---|---|
| 2,238,638 | 4/1941 | Gleason | 252—52 |
| 2,282,343 | 5/1942 | Prutton | 252—407 |
| 2,753,307 | 7/1956 | Foehr et al. | 252—55 |
| 2,818,440 | 12/1957 | Rust et al. | 260—617 |

DANIEL E. WYMAN, *Primary Examiner.*